(12) United States Patent
Chundury et al.

(10) Patent No.: US 8,008,388 B2
(45) Date of Patent: Aug. 30, 2011

(54) WEATHERABLE GLASS FIBER REINFORCED POLYOLEFIN COMPOSITION

(75) Inventors: Deenadayalu Chundury, Newburgh, IN (US); Benjamin A. Jones, Evansville, IN (US); Theophilus McGee, Mt. Carmel, IL (US); Morris Mou-Shen Lee, Newburgh, IN (US); Junior R. Seymour, Wadesville, IN (US)

(73) Assignee: Ferro Corporation, Cleveland, OH (US)

( * ) Notice: Subject to any disclaimer, the term of this patent is extended or adjusted under 35 U.S.C. 154(b) by 1416 days.

(21) Appl. No.: 11/304,993

(22) Filed: Dec. 14, 2005

(65) Prior Publication Data
US 2007/0135547 A1 Jun. 14, 2007

(51) Int. Cl.
*C08K 5/04* (2006.01)

(52) U.S. Cl. ........ 524/394; 524/504; 524/431; 524/432; 524/423; 524/400; 524/433; 524/494; 524/102; 524/101; 524/100

(58) Field of Classification Search ............... 524/504, 524/431, 432, 423, 400, 100, 101, 102, 394, 524/494
See application file for complete search history.

(56) References Cited

U.S. PATENT DOCUMENTS

| | | | |
|---|---|---|---|
| 4,175,977 A | 11/1979 | Heaton et al. | |
| 4,999,055 A | 3/1991 | Holtzen et al. | |
| 5,258,422 A | 11/1993 | Chang et al. | |
| 5,264,280 A | 11/1993 | Chundury et al. | |
| 5,374,680 A | 12/1994 | Chundury et al. | |
| 5,385,781 A | 1/1995 | Chundury et al. | |
| 5,601,889 A | 2/1997 | Chundury et al. | |
| 5,660,802 A | 8/1997 | Archer et al. | |
| 5,969,027 A | 10/1999 | Chundury et al. | |
| 6,107,390 A | 8/2000 | Maeda et al. | |
| 6,150,442 A | 11/2000 | Chundury et al. | |
| 6,281,278 B1 | 8/2001 | Takase et al. | |
| 6,518,344 B1 | 2/2003 | Chundury et al. | |
| 6,599,595 B1 | 7/2003 | Chundury et al. | |
| 6,664,313 B2 | 12/2003 | Hirai et al. | |
| 6,696,570 B2* | 2/2004 | Sassi et al. | 546/188 |
| 6,723,399 B2 | 4/2004 | Chundury et al. | |
| 6,911,492 B2 | 6/2005 | Keener et al. | |
| 6,958,091 B1 | 10/2005 | Craig | |
| 2006/0122308 A1* | 6/2006 | Wermter et al. | 524/445 |

FOREIGN PATENT DOCUMENTS
WO WO 2004063268 A1 * 7/2004
* cited by examiner

*Primary Examiner* — Peter D Mulcahy
(74) *Attorney, Agent, or Firm* — Rankin, Hill & Clark LLP

(57) ABSTRACT

Glass fiber reinforced olefin compositions comprise polypropylene homopolymers, polypropylene copolymers, opacifying pigments, fibrous reinforcers, light stabilizers, lubricants and antioxidants. The opacifying pigments are advantageously ZnO, ZnS or surface treated anatase $TiO_2$.

19 Claims, No Drawings

WEATHERABLE GLASS FIBER REINFORCED POLYOLEFIN COMPOSITION

FIELD OF INVENTION

The present invention relates to a polymer blend and, more particularly, to a glass fiber reinforced polyolefin composition that displays high tensile strength and resistance to discoloration.

BACKGROUND OF THE INVENTION

Polymer blends comprising polyolefins are known in the art. Various polymer blends comprising polyolefins are disclosed, for example, in Chundury et al., U.S. Pat. Nos. 6,911, 492, 5,969,027, 5,321,081, and 5,264,280. Polyolefins such as polypropylene provide a lower cost alternative to engineering resins such as acrylonitrile butadiene styrene (ABS) polymer resins, and are thus used in a variety of applications including, for example, preparing parts for the automotive industry, for communication devices such as telephones, radios, televisions, cassettes, for power tools, for appliances and other household implements, for floor care products, for business machines, and in the manufacture of toys and furniture.

Glass fiber reinforced plastics compounds tend to have poor physical properties due to the use of rutile titanium dioxide in pre-colored compounds. Rutile titanium dioxide provides outdoor weathering stability, however. In liquid handling applications, burst pressure is a key property as well as weathering stability. As a white pigment, zinc sulfide (ZnS) does not cause as severe physical property degradation as $TiO_2$, however ZnS becomes somewhat transparent after weathering, which allows other pigments to show through somewhat strongly, and change the observed color of an article so produced. This leads to compounds that can be darker after outdoor exposure. Zinc oxide (ZnO) provides UV stability, and does not degrade physical properties as severely. However, three times as much ZnO is needed to achieve similar opacity as a given amount of ZnS. Anatase titanium dioxide causes less degradation than rutile $TiO_2$, however after some exposure the materials become photoactive, leading to chalking (microcrazing) on the material's surface. A specially surface treated grade of anatase titanium dioxide was explored which, in conjunction with hindered amine light stabilizers, provide superior UV stability, without the loss of physical properties, particularly strength properties.

BRIEF SUMMARY OF THE INVENTION

The present invention provides an injection moldable glass fiber reinforced polyolefin blend composition that resists surface discoloration and chalking when exposed to weathering and further exhibits high tensile strength and burst strength. The polymer blend composition according to the invention comprises: (A) a polymer package; (B) an opacifying pigment; (C) a fibrous reinforcer; (D) a light stabilizer package; (E) a lubricant package; and (F) an antioxidant package.

The polymer package (A) comprises a blend of: (Ai) one or more polypropylene homopolymers; (Aii) one or more polypropylene copolymers; and (Aiii) one or more maleic anhydride modified (grafted) homopolymers or copolymers, or blends thereof.

As an opacifying pigment, a surface treated grade of anatase titanium dioxide was explored which, in conjunction with hindered amine light stabilizers, provide superior UV stability, while maintaining sufficient physical properties for use in intended applications.

The injection-moldable polymer blend according to the invention is particularly suitable for forming parts that will be exposed both to high-pressure operating environments, and to general weathering—sun, rain, snow, ice—such as a pool filter housing. Unlike conventional polymer blends comprising polypropylene, the polymer blend according to the invention resists surface discoloration and chalking when exposed to such environments. Further, the polymer blend maintains a sufficient tensile strength and burst resistance owing to the fibrous fillers, e.g., glass fibers. Without being bound to a particular theory, applicants believe the combination of an opacifying pigment, a fibrous reinforcer, and a decreased loading of antioxidants relative to the prior art, in the polymer blend synergistically operates both to inhibit and/or retard the formation of color producing species such as chromophores, on the surface of the thermoformed part, as well as preserve superior tensile strength and burst strength.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

As noted above, the glass fiber reinforced polyolefin composition according to the present invention comprises: (A) a polymer package; (B) an opacifying pigment; (C) a fibrous reinforcer; (D) a light stabilizer package; (E) a lubricant package; and (F) an antioxidant package. Each of the components comprising the polymer blend according to the invention is separately discussed in greater detail below. All percentages are by weight and with respect to 100 wt % of the overall glass fiber reinforced polyolefin composition.

(A) Polymer Package

The discoloration resistant polymer blend composition according to the present invention comprises from about 20 wt % to about 95 wt %, more preferably about 60 wt % to about 90 wt %, even more preferably about 70 wt % to about 85 wt % and most preferably about 77 wt %, of a polymer package (A). The polymer package (A) comprises a blend of: (Ai) one or more polypropylene homopolymers; (Aii) one or more polypropylene copolymers; and (Aiii) one or more maleic anhydride copolymers. Each component of polymer package is separately discussed in greater detail below.

(Ai) Polypropylene Homopolymers

With respect to 100 wt % of the overall glass fiber reinforced polyolefin composition, the polymer package (A) comprises from about 40% to about 90% by weight, and more preferably from about 50% to about 80% by weight, still more preferably about 50 wt % to about 60 wt % and most preferably about 55% by weight, of one or more polypropylene homopolymers (Ai). The number average molecular weight of such polypropylene polymers is preferably above about 10,000, and more preferably above about 50,000. Preferably, the polypropylene homopolymers of the invention have a melt flow of about 2 to about 20 according to ASTM D1238. While a variety of polypropylene homopolymers having the aforementioned characteristics are suitable in the practice of the present invention, the presently most preferred polypropylene homopolymer for use in the invention is available from Philips Sumika Polypropylene Company of Woodlands, Tex., as Marlex® HGX-120.

(Aii) Polypropylene Copolymers

With respect to 100 wt % of the overall glass fiber reinforced polyolefin composition, the polymer package (A) also comprises about 10 wt % to about 50 wt %, preferably about 15 to about 35 wt %, more preferably about 20 wt % to about 30 wt %, still more preferably about 20 wt % to about 25 wt % of a polypropylene copolymer, and most preferably about 22 wt % of one or more polypropylene copolymers (Aii). Polypropylene impact copolymers for use in injection molding are particularly preferred for use in the invention. The polypropylene copolymers may include monomer units such as ethylene, butene, hexane, and octane, and combinations thereof. Such copolymers of polypropylene typically have a melt flow value of less than about 2, and most preferably about 0.5, as measured in accordance with ASTM D1238. One suitable polypropylene copolymer is ACCTUF® 3045 Impact Copolymer from BP Amoco Polymers, Inc. However, the presently most preferred polypropylene impact copolymer for use in the invention is available from Basell Polyolefins of Elkton, Md., as Pro-fax® 8623. There are many other commercially available homopolymers and copolymers of polypropylene that are suitable for use in the invention, and they may be either semicrystalline or crystalline in structure.

(Aiii) Maleic Anhydride Copolymers

With respect to 100 wt % of the overall glass fiber reinforced polyolefin composition, the polymer package (A) also comprises about 0.1 wt % to about 3 wt %, preferably 0.2 wt % to about 2 wt %, more preferably about 0.5 to about 2 wt %, still more preferably about 0.5 wt % to about 1 wt % of one or more maleic anhydride copolymers. A maleic anhydride grafted polypropylene (MAH-PP) is preferred, and serves as a coupling agent between fibrous reinforcers and the bulk polypropylene resins. A typical MAH-PP comprises about 95 wt % to about 99.9 wt % polypropylene and about 0.1 to 5 wt % of maleic anhydride. The number average molecular weight ($M_N$) of the MAH-PP is from about 1000 to about 5000. A variety of MAH-PPs having the aforementioned characteristics are suitable in the practice of the present invention, however, the presently most preferred maleic anhydride graft polypropylene copolymer in the invention is available from Eastman Chemical Co., Kingsport, Tenn., as Epolene® G-3015.

(B) Opacifying Pigment

With respect to 100 wt % of the overall glass fiber reinforced polyolefin composition, the polymer blend according to the invention also comprises from about 0.1 to about 5 wt %, and more preferably from about 0.1 to about 3 wt %, and most preferably about 0.3 wt % of at least one opacifying pigment. Suitable opacifying pigments include ZnO, ZnS, $TiO_2$, and combinations thereof. ZnO and ZnS are suitable alone or together because they are not abrasive, and hence do not degrade the fibrous reinforcers discussed hereinbelow. When strength properties are not a concern, $TiO_2$ in both crystalline forms, anatase and rutile, are also suitable for their whitening and opacifying power. However, rutile $TiO_2$ is an abrasive, which tends to degrade the fibrous reinforcers needed in the composition.

Superior physical properties such as tensile strength and burst strength are believed to result from the use of a fibrous reinforcer. Mineral fillers such as $TiO_2$ and $Al_2O_3$ tend to be abrasive, and hence degrade fibrous reinforcers by physical cutting. It is believed that surface treatment on the mineral filler prevents the otherwise abrasive mineral filler particles from abrading or cutting the fibrous reinforcer. Hence, surface treatment of abrasive fillers such as $TiO_2$ is employed for the smoothing effect it has on the filler, and hence, the preservative effect on the fibrous reinforcer, and ultimately, on the improvement of physical properties.

Titanium dioxide is white pigment, which is typically manufactured in two crystal forms: anatase and rutile. Both crystal forms produce high opacity due to their high refractive index. In general the rutile titanium dioxide offers superior weatherability over anatase (untreated), which absorbs electrons through UV initiated radical (photo catalytic) degradation. However, a specially treated anatase titanium dioxide offers both needed opacity as well as durability (UV resistance) while retaining key mechanical properties. In a preferred embodiment, the glass fiber reinforced polyolefin composition comprises about 0.1 to about 0.3 wt % of at least two pigments selected from the group consisting of ZnO, ZnS, and surface treated anatase $TiO_2$. The presently most preferred opacifying pigment is available from Sachtleben Chemie of Duisburg, Germany as Hombitan® LO-CR-S-M, which is believed to be coated with a combination of organic and inorganic surface coatings including Al, Si, and Mn, which may include one or more of organoaluminum compounds, organosilicon compounds or organomanganese compounds.

(C) Fibrous Reinforcers.

With respect to 100 wt % of the glass fiber reinforced polyolefin composition, the glass fiber reinforced polyolefin composition also comprises reinforcing fillers. The composition comprises about 10 wt % to about 40 wt %, preferably 15 wt % to about 25 wt %, and most preferably about 21 wt % of such fillers. Broadly, the reinforcing fillers can be particulate or fibrous. Particulate fillers include mica, talc, kaolin, calcium carbonate, wollastonite (calcium silicate), dolomite (calcium magnesium silicate), barium sulfate, carbon black, graphite, and wood flour. Fibrous fillers (fibrous reinforcers) include glass fibers, boron fibers, carbon fibers and other fibers. Glass fibers are preferred herein. The glass fibers are typically rod shaped, that is, they have a length that is several times their width (i.e., aspect ratio). More precisely, the glass fibers useful herein have an aspect ratio of about 10 to about 500, preferably about 25 to about 200, and more preferably about 50:1 to about 100:1. On average, the glass fibers are typically $\frac{1}{25}$" (0.1 mm) to about 1" (25 mm), preferably about $\frac{1}{8}$" (3 mm) to about $\frac{1}{2}$" (13 mm) in length, for example about $\frac{3}{16}$" (5 mm) and the fiber diameters are typically about 8 μm (microns) to about 20 μm, preferably about 10 μm to about 17 μm, and most preferably about 12 μm to about 15 μm. The presently most preferred fibrous reinforcer is available from Owens Corning of Toledo, Ohio as product number 147A14P. The reinforcing fillers may be treated with coupling agents to improve the bond between the fillers and the resin.

(D) Light Stabilizer Package.

A light stabilizer package comprises one or more light stabilizers. Hindered amine light stabilizers (HALS) are typically used in polyolefin polymer compositions. They are derivatives of 2,2,6,6-tetramethyl piperidine and are extremely efficient stabilizers against light-induced degradation of most polymers. The glass fiber reinforced polyolefin composition of the invention comprises about 0.1 wt % to about 3 wt % of HALS. Preferably, the inventive composition comprises about 0.1 wt % to about 2 wt % of a low molecular weight (LMW) HALS and about 0.1 to about 2 wt % of a high molecular weight (HMW) HALS. More preferably, the composition comprises about 0.2 wt % to about 1 wt % of each, and most preferably, about 0.1 wt % to about 0.3 wt % each of a HMW HALS and a LMW HALS. A HMW HALS has a $M_N$ of greater than 1000 to about 5000, while a LMW HALS has a $M_N$ of about 100 to 1000.

HALS do not absorb UV radiation, but act to inhibit degradation of the polymer. They slow down the photochemically initiated degradation reactions, to some extent in a similar way to antioxidants. One advantage of the hindered amine light stabilizers is that no specific layer thickness or concentration limit needs to be reached to guarantee good results. Significant levels of stabilization are achieved at relatively low concentrations. The high efficiency and longevity of HALs are due to a cyclic process wherein the HALS are regenerated (not consumed) during the stabilization process.

U.S. Pat. No. 5,770,115, incorporated by reference, discloses a variety of HALS suitable for the practice of the present invention including those HALS materials reported to function as radical scavengers and that contain a 2,2,6,6-tetramethylpiperperidine ring or 2,2,6,6-tetramethylpiperperazinone. Such useful HALS include bis(1,2,2,6,6-pentamethyl-4-piperdinyl)>3,5-bis(1,1-dimethylethyl-4-hydroxyphenyl)methyl-butyl propanedioate; bis(2,2,6,6-tetramethyl-4-piperdinyl)decanedioate; 1-acetyl-4-(3-dodecyl-2,5-dioxo-1-pyrrolidinyl)-2,2,6,6-tetramethyl-piperidine; N-unsubstituted HALS compounds, e.g., Sanduvor® 3051, 3052 AND 3055; N-methylated HALS compounds, e.g., Sanduvor® 3056; and mixtures thereof. More preferably, the HALS material is selected from the group consisting of bis(2,2,6,6-tetramethyl-4-piperdinyl)decanedioate; 1-acetyl-4-(3-dodecyl-2,5-dioxo-1-pyrrolidinyl)-2,2,6,6-tetramethyl-piperidine; N-unsubstituted HALS compounds and mixtures thereof.

Other commercially available HALS include Chimassorb® 119, Chimassorb® 944, Chimassorb® 2020, Cyasorb® UV-3346; Cyasorb® UV-3529, Hostavin® N30 Formulation P, Tinuvin® 111, Tinuvin® 123, Tinuvin® 622, Tinuvin® 770, Tinuvin® 783, Uvasil® 299, Uvasorb® HA88 and Uvinul® 5050H. Irgafos®, Irgastab®, Tinuvin® and Chimassorb® are trademarks of Ciba Specialty Chemicals Corporation. Cyasorb® is a trademark of Cytec Corporation. Hostavin® and Sanduvor® are trademarks of Clariant Corporation of Coventry, R.I. Uvinul® is a trademark of BASF. Uvasil® is a trademark of Enichem of Houston, Tex. Uvasorb® is a trademark of 3V Sigma SpA of Bergamo, Italy. The presently most preferred LMW HALS is Tinuvin® 770, and the most preferred HMW HALS is Chimassorb® 944.

(E) Lubricant Package

The polymer blend further comprises from about 0.01 to about 1.0% by weight, and more preferably from about 0.01 to about 0.5% by weight, and most preferably about 0.01 wt % to about 0.1% by weight, of one or more lubricants, such as waxes, often called metallic soaps. Suitable lubricants include, for example, zinc stearate, calcium stearate, magnesium stearate and mixtures of the foregoing. In one embodiment, the composition comprises about 0.01 wt % to about 0.1 wt % zinc stearate, about 0.01 wt % to about 0.25 wt % zinc dibutyldithiocarbamate and about 0.01 wt % to about 0.3 wt % calcium stearate. The presently most preferred lubricant package for use in the invention is a white powder comprising a combination of zinc stearate and zinc dibutyldithiocarbamate in a 75 wt %/25 wt % ratio that is available from R.T. Vanderbilt Company, Inc. as VANOX® 898.

With respect to physical properties of the inventive compositions, it is believed that the use of a non-abrasive opacifying pigment (ZnO, ZnS or surface treated anatase $TiO_2$) serves to strengthen the composition while avoiding degradation of fibrous reinforcers such as glass fibers. It is believed that specially surface-treated anatase $TiO_2$ is preferable to rutile $TiO_2$ because it is less abrasive, and hence less damaging to fibrous fillers, while providing an acceptable level of weathering durability by industry standards.

(F) Antioxidant Package

Antioxidants for polyolefin blends are well known. For example, hindered phenolic antioxidants are particularly effective in preventing deterioration of physical properties during the preparation of polymer blends and in extending the useful life of the end product. The hindered phenolic antioxidants suitable for use in the context of the present invention conform structurally to:

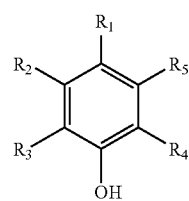

wherein $R_1$, $R_2$ and $R_5$ independently are a hydrogen atom or an alkyl group, $R_3$ and $R_4$ independently are alkyl groups containing at least 4 carbon atoms, preferably a $C_3$-$C_{10}$ alkyl group and more preferably a tertiary butyl group. Specific examples of such hindered phenols include butylated hydroxytoluene (BHT) and butylated hydroxyethyl benzene (BHEB). Depending on desired properties, either or both of primary antioxidants or secondary antioxidants can be used to stabilize an olefin composition. Other suitable antioxidants are disclosed in U.S. Pat. No. 6,902,695, for example, those available from CIBA Specialty Chemicals as IRGANOX® B-225. IRGANOX® B-225 comprises a 1:1 blend of tetrakis [methylene(3,5-di-tert-butyl-4-hydroxyhydrocinnamate)]-methane, which is also independently sold by CIBA Specialty Chemicals as IRGANOX® 1010, and tris(2,4-di-t-butylphenyl)phosphite, which is also independently sold by CIBA Specialty Chemicals as IRGAFOS® 168.

Generally, the amount of antioxidants used will be about 0.01 wt % to about 1.0% wt % and preferably about 0.05 to about 0.8 wt %, more preferably about 0.1 wt % to about 0.6 wt %. In a preferred embodiment, the glass fiber reinforced polyolefin composition comprises about 0.025 wt % to about 0.2 wt % of primary antioxidants and about 0.2 wt % to about 0.6 wt % of secondary phenolic antioxidants. The presently most preferred primary antioxidant is a phenolic available as Chinox® 3114 from, Maroon Incorporated of Avon, Ohio, which is 1,3,5-Tris-(3,5-di-tert-butyl-4-hydroxybenzyl)isocyanate. The presently most preferred secondary antioxidant is DSTDP, which is Dioctadecyl 3,3'-thiodipropionate, also available from Maroon Incorporated as Evanstab® 18, (a trademark of Hampshire Chemical Corporation) or VANOX® DSTDP from RT Vanderbilt Co.

Other additives. The polymer blends according to the present invention can further optionally comprises about 0.1 to about 10 wt %, preferably 0.2 to 5 wt % and most preferably about 0.3 wt % of other additives, including pigments or colorants. Any of the conventional inorganic color pigments can be used, but the improvement in surface discoloration produced by the invention will be most apparent in lightly colored or white applications. To adjust the color and hue, one or more inorganic or organic colorants or dyes can also be used, as is well known in the art.

Preparation of Polymer Blends. The blended polymer compositions of the present invention can be prepared using techniques that are well known to those skilled in the art. For example, a particularly useful procedure is to intimately mix the polymers in the polymer package using conventional melt mixing equipment such as a mill, a Banbury, a Brabender, a single or twin screw extruder, continuous mixers, or kneaders. For example, the polymers may be intimately mixed in the form of granules and/or powder in a high shear mixer. The preferred process is twin screw extrusion (using a Werner-Pfleiderer ZSK40 twin screw-extruder) compounding at standard polypropylene process conditions as known in the art. "Intimate" mixing means that the mixture is prepared with sufficient mechanical shear and thermal energy to produce a dispersed phase that is finely divided and homogeneously dispersed in the continuous or principal phase.

The following examples are intended only to illustrate the invention and should not be construed as imposing limitations upon the claims. Unless otherwise indicated in the following examples and elsewhere in the specification and claims, all parts and percentages are by weight, temperatures are in degrees centigrade and pressures are at or near atmospheric.

EXAMPLE 1

Glass fiber reinforced olefin compositions were made in accordance with the ingredients and conditions in Table 1 below. Sample compositions and a control were prepared by combining the components listed in Table 1 in a Werner Pfleiderer twin screw extruder (ZSK 40) at 500 rpm. All compositions were then extruded at 520° F. into strands which were then passed through a water bath prior to pelletizing. The compounded pellets were injection molded at 560° F. into test specimens. The physical properties of the control and sample compositions are listed in Table 1, below. RCL-188 is a rutile $TiO_2$ available from Millennium Chemicals of Hunt Valley, Md. Sachtolith® L is a zinc sulfide powder available from Sachtleben Chemie of Duisburg, Germany.

ILM ZnO is a zinc oxide powder available from JLM Chemicals of Tampa, Fla. Ferro CaSt 12(b) is a calcium stearate available from Ferro Corporation of Cleveland, Ohio. Grey pigment package is a blend of GMZ BK-5009 Iron Oxide Black (16.7 wt %) available from GMZ Chemicals of West Chester, Ohio, with Ferro Blue EP-62 (24.6 wt %), available from Ferro Corporation, with Shepherd Violet 11 (49.7 wt %) available from Shepherd Color of Cincinnati, Ohio, with Irgazin® Yellow 3RLTN available from Ciba Chemicals of Tarrytown, N.Y.

With respect to the sample testing parameters, a burst pressure test strength of 105 psi or greater is considered a "pass." A "pass" in the Delta E tests is a value less than 2. "None" means that the parameter was not determined.

With respect to the chalking test, a proprietary method is used to determine chalking of samples exposed to Xenon Arc accelerated weathering testing. A piece of black cloth material is swiped across a sample that had been previously exposed to accelerated weathering. The cloth is then viewed and rated from 0 to 5 based on the total amount of chalking (residue from the sample) picked up by the cloth. A rating of zero means no chalking; a rating of 1 is extremely light chalking; a rating of 2 is very light chalking, 3 is moderate chalking, 4 is heavy chalking and 5 is extreme chalking. A rating of 0, 1, or 2 is considered a "pass."

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

| Material Description (wt %) | BRAND OR TYPE | Control | Ex. 1 | Ex. 2 | Ex. 3 | Ex. 4 |
|---|---|---|---|---|---|---|
| (A) Polymer Package | | | | | | |
| Polypropylene Homopolymer | Marlex ® HGX-120 | 54.90735 | 54.90735 | 54.90735 | 54.90735 | 54.30735 |
| Polypropylene Copolymer | Pro-fax ® 8623 | 22 | 22 | 22 | 22 | 22 |
| Maleic-Anhydride Grafted PP | EPOLENE ® G-3015 | 0.8 | 0.8 | 0.8 | 0.8 | 0.8 |
| (B) opacifying pigment | | | | | | |
| Anatase $TiO_2$ | Hombitan ® | 0.3 | | | | |
| Rutile $TiO_2$ | RCL-188 | | 0.3 | | | |
| Zinc Sulfide | Sactolith ® L | | | 0.3 | | |
| Treated Anatase $TiO_2$ | Hombitan LO-CR-S-M | | | | | |
| Zinc Oxide | JLM ZnO | | | | | 0.9 |
| (C) Fibrous reinforcer | | | | | | |
| Glass Fiber | 147A14P | 21 | 21 | 21 | 21 | 21 |
| (D) light stabilizer package | | | | | | |
| LMW HALS | Tinuvin ® 770 | 0.25 | 0.25 | 0.25 | 0.25 | 0.25 |
| HMW HALS | Chimassorb ® 944 | 0.125 | 0.125 | 0.125 | 0.125 | 0.125 |
| (E) Antioxidant Package | | | | | | |
| Primary Antioxidant | Chinox ®3114 | 0.05 | 0.05 | 0.05 | 0.05 | 0.05 |
| Secondary Antioxidant | Evanstab ® 18 | 0.05 | 0.05 | 0.05 | 0.05 | 0.05 |
| (F) Lubricant Package | | | | | | |
| Zn Stearate/DTDCB | VANOX ® 898 | 0.06 | 0.06 | 0.06 | 0.06 | 0.06 |
| Calcium Stearate | Ferro CaSt 12B | 0.15765 | 0.15765 | 0.15765 | 0.15765 | 0.15765 |
| (G) Pigment package | | | | | | |
| Grey Pigment Package | See text | 0.3 | 0.3 | 0.3 | 0.3 | 0.3 |
| Characteristics | | | | | | |
| Tensile Strength, psi | | 8,650 | 7,290 | 9,260 | 8,630 | 8,760 |
| Burst Pressure Test | | Pass | Fail | Pass | None | None |
| Delta E, 1 Week Exposure | | 1.31/Pass | None | 2.04/Fail | 0.046/Pass | 0.29/Pass |

-continued

| | | | | | |
|---|---|---|---|---|---|
| Delta E, 4 Week Exposure | | 22.69/Fail | None | 3.56/Fail | 4.94/Fail | 2.03/Fail |
| Chalking | | Yes/Fail | None | No/Pass | Yes/Fail | No/Pass |

| Material Description (wt %) | BRAND OR TYPE | Ex. 5 | Ex. 6 | Ex. 7 | Ex. 8 |
|---|---|---|---|---|---|
| (A) Polymer Package | | | | | |
| Polypropylene Homopolymer | Marlex ® HGX-120 | 54.60735 | 54.60735 | 54.90735 | 54.78235 |
| Polypropylene Copolymer | Pro-fax ® 8623 | 22 | 22 | 22 | 22 |
| Maleic-Anhydride Grafted PP | EPOLENE ® G-3015 | 0.8 | 0.8 | 0.8 | 0.8 |
| (B) opacifying pigment | | | | | |
| Anatase TiO₂ | Hombitan ® | | | | |
| Rutile TiO₂ | RCL-188 | | | | |
| Zinc Sulfide | Sactolith ® L | | 0.15 | 0.15 | |
| Treated Anatase TiO₂ | Hombitan LO-CR-S-M | 0.15 | | 0.15 | 0.3 |
| Zinc Oxide | JLM ZnO | | 0.45 | | |
| (C) Fibrous reinforcer | | | | | |
| Glass Fiber | 147A14P | 21 | 21 | 21 | 21 |
| (D) light stabilizer package | | | | | |
| LMW HALS | Tinuvin ® 770 | 0.25 | 0.25 | 0.25 | 0.25 |
| HMW HALS | Chimassorb ® 944 | 0.125 | 0.125 | 0.125 | 0.25 |
| (E) Antioxidant Package | | | | | |
| Primary Antioxidant | Chinox ®3114 | 0.05 | 0.05 | 0.05 | 0.05 |
| Secondary Antioxidant | Evanstab ® 18 | 0.05 | 0.05 | 0.05 | 0.05 |
| (F) Lubricant Package | | | | | |
| Zn Stearate/DTDCB | VANOX ® 898 | 0.06 | 0.06 | 0.06 | 0.06 |
| Calcium Stearate | Ferro CaSt 12B | 0.15765 | 0.15765 | 0.15765 | 0.15765 |
| (G) Pigment package | | | | | |
| Grey Pigment Package | See text | 0.3 | 0.3 | 0.3 | 0.3 |
| Characteristics | | | | | |
| Tensile Strength, psi | | 8,660 | 8,820 | 8,670 | 8,540 |
| Burst Pressure Test | | Pass | None | None | Pass |
| Delta E, 1 Week Exposure | | 0.35/Pass | 1.06/Pass | 0.91/Pass | 0.44/Pass |
| Delta E, 4 Week Exposure | | 1.85/Pass | 1.07/Pass | 1.90/Pass | 0.66/Pass |
| Chalking | | No/Pass | No/Pass | No/Pass | No/Pass |

What is claimed is:

1. A composition comprising:
   a. about 40 wt % to about 90 wt % of a polypropylene homopolymer,
   b. about 10 wt % to about 50 wt % of a polypropylene copolymer,
   c. about 10 wt % to about 40 wt % of a fibrous reinforcer,
   d. about 0.1 wt % to about 2 wt % of a hindered amine light stabilizer having a molecular weight from about 100 to 1000,
   e. about 0.1 wt % to about 2 wt % of a hindered amine light stabilizer having a molecular weight of greater than 1000 to about 5000,
   f. about 0.05 wt % to about 0.8 wt % of antioxidants,
   g. about 0.01 wt % to about 1 wt % of a lubricant package,
   h. about 0.1 wt % to about 3 wt % of a maleic anhydride copolymer,
   i. about 0.1 wt % to about 0.3 wt % of a pigment selected from the group consisting of ZnO, ZnS, and surface treated anatase TiO₂.

2. The composition of claim 1 wherein the surface treated anatase TiO₂ comprises anatase TiO₂, aluminum, silicon, manganese, and at least one organic compound.

3. The composition of claim 1 wherein the surface treated anatase TiO₂ comprises anatase TiO₂, and at least one composition selected from the group consisting of organoaluminum, organosilicon and organomanganese.

4. The composition of claim 1 wherein the antioxidants comprise:
   a. about 0.025 wt % to about 0.2 wt % of a primary phenolic antioxidant, and
   b. about 0.2 wt % to about 0.6 wt % of a secondary phenolic antioxidant.

5. The composition of claim 1 comprising about 50 wt % to about 80 wt % of polypropylene homopolymer and about 15 wt % to about 35 wt % of polypropylene copolymer.

6. The composition of claim 1 wherein the lubricant package comprises at least one selected from the group consisting of:
   a. about 0.01 wt % to about 0.1 wt % zinc stearate,
   b. about 0.01 wt % to about 0.025 wt % zinc dibutyldithiocarbamate, and
   c. about 0.01 wt % to about 0.3 wt % calcium stearate, and combinations thereof.

7. The composition of claim 1 wherein the glass fibers have an average length of 0.1 to 25 mm.

8. The composition of claim 1 wherein the glass fibers have an aspect ratio of about 10 to about 500.

9. The composition of claim 1 wherein the polypropylene copolymer further comprises monomer units selected from the group consisting of ethylene, butene, hexane, and octane.

10. The composition of claim 1, comprising:
   a. about 50 wt % to about 80 wt % of a polypropylene homopolymer,
   b. about 15 wt % to about 35 wt % of a polypropylene copolymer,
   c. about 10 wt % to about 40 wt % of glass fiber, d. about 0.2 wt % to about 1 wt % of a hindered amine light stabilizer having a molecular weight from about 100 to 1000,
e. about 0.2 wt % to about 1 wt % of a hindered amine light stabilizer having a molecular weight of greater than 1000 to about 5000,
f. about 0.025 wt % to about 0.02 wt % of a primary phenolic antioxidant,
g. about 0.2 wt % to about 0.6 wt % of a secondary phenolic antioxidant,
h. about 0.01 wt % to about 0.1 wt % zinc stearate,
i. about 0.01 wt % to about 0.025 wt % zinc dibutyldithiocarbamate,
j. about 0.01 wt % to about 0.3 wt % calcium stearate,
k. about 0.2 wt % to about 2 wt % maleic anhydride grafted polypropylene, and
l. about 0.1 wt % to about 0.3 wt % surface treated anatase titanium dioxide.

11. The composition of claim 1, comprising:
a. about 50 wt % to about 60 wt % of a polypropylene homopolymer,
b. about 20 wt % to about 30 wt % of a polypropylene copolymer,
c. about 15 wt % to about 25 wt % of a fibrous reinforcer,
d. about 0.1 wt % to about 0.3 wt % of a hindered amine light stabilizer having a molecular weight from about 100 to 1000,
e. about 0.1 wt % to about 0.3 wt % of a hindered amine light stabilizer having a molecular weight of greater than 1000 to about 5000,
f. about 0.025 wt % to about 0.02 wt % of a primary phenolic antioxidant,
g. about 0.2 wt % to about 0.6 wt % of a secondary phenolic antioxidant,
h. about 0.01 wt % to about 0.1 wt % zinc stearate,
i. about 0.01 wt % to about 0.025 wt % zinc dibutyldithiocarbamate,
j. about 0.01 wt % to about 0.3 wt % calcium stearate,
k. about 0.5 wt % to about 1 wt % maleic anhydride grafted polypropylene, and
l. about 0.1 wt % to about 0.3 wt % surface treated anatase titanium dioxide.

12. An article of manufacture comprising the composition of claim 1.

13. The article of claim 12 having a tensile strength of at least 8000 psi.

14. The article of claim 12 having a $\Delta E$ value (CIE L*a*b) of <2 units after exposure to a xenon arc lamp in accordance with ASTM D 2565 for one week.

15. The article of claim 12 having a $\Delta E$ value (CIE L*a*b) of <4 units after exposure to a xenon arc lamp in accordance with ASTM D 2565 for four weeks.

16. The composition of claim 1 wherein the pigment is surface treated anatase $TiO_2$.

17. The composition of claim 16 wherein the surface treated anatase $TiO_2$ comprises anatase $TiO_2$, aluminum, silicon, manganese, and at least one organic compound.

18. The composition of claim 16 wherein the surface treated anatase $TiO_2$ comprises anatase $TiO_2$, and at least one composition selected from the group consisting of organoaluminum, organosilicon and organomanganese.

19. A composition comprising:
j. about 40 wt % to about 90 wt % of a polypropylene homopolymer,
k. about 10 wt % to about 50 wt % of a polypropylene copolymer,
l. about 10 wt % to about 40 wt % of a fibrous reinforcer,
m. about 0.1 wt % to about 2 wt % of a hindered amine light stabilizer having a molecular weight from about 100 to 1000,
n. about 0.1 wt % to about 2 wt % of a hindered amine light stabilizer having a molecular weight of greater than 1000 to about 5000,
o. about 0.05 wt % to about 0.8 wt % of antioxidants,
p. about 0.01 wt % to about 1 wt % of a lubricant package,
q. about 0.1 wt % to about 3 wt % of a maleic anhydride copolymer,
r. about 0.1 wt % to about 5 wt % of at least two pigments selected from the group consisting of ZnO, ZnS, and surface treated anatase $TiO_2$.

* * * * *